United States Patent
Neuhaus-Steinmetz et al.

(10) Patent No.: US 7,518,126 B2
(45) Date of Patent: Apr. 14, 2009

(54) DOSING FILM AND ASSOCIATED METHOD

(75) Inventors: Hermann Neuhaus-Steinmetz, Ahrensburg (DE); Dennis Perlbach, Neu Wulmstorf (DE); Dieter Muller, Kutenholz-Mulsum (DE)

(73) Assignee: Tesa AG, Hamburg (DE)

( * ) Notice: Subject to any disclaimer, the term of this patent is extended or adjusted under 35 U.S.C. 154(b) by 0 days.

(21) Appl. No.: 10/599,933

(22) PCT Filed: Apr. 20, 2005

(86) PCT No.: PCT/EP2005/051734

§ 371 (c)(1),
(2), (4) Date: May 24, 2007

(87) PCT Pub. No.: WO2005/108937

PCT Pub. Date: Nov. 17, 2005

(65) Prior Publication Data

US 2007/0221864 A1    Sep. 27, 2007

(30) Foreign Application Priority Data

May 5, 2004    (DE) .................. 10 2004 022 071

(51) Int. Cl.
*G01T 1/06*    (2006.01)
(52) U.S. Cl. .................................. 250/474.1
(58) Field of Classification Search ........... 250/474.1
See application file for complete search history.

(56) References Cited

U.S. PATENT DOCUMENTS

| | | | | |
|---|---|---|---|---|
| 3,652,854 A | * | 3/1972 | Wheeler | 250/484.3 |
| 3,787,687 A | | 1/1974 | Trumble | |
| 4,130,760 A | | 12/1978 | Fanselow et al. | |
| 4,829,187 A | * | 5/1989 | Tomita et al. | 250/474.1 |
| 5,451,792 A | | 9/1995 | Maguire et al. | |
| 5,767,520 A | | 6/1998 | Donahue et al. | |
| 6,015,621 A | | 1/2000 | Lischewski et al. | |

FOREIGN PATENT DOCUMENTS

| | | |
|---|---|---|
| DE | 196 51 381 | 11/1997 |
| DE | 197 19 721 | 9/1998 |
| DE | 694 11 976 T2 | 12/1998 |
| DE | 299 17 746 U1 | 9/2000 |
| WO | WO 2004/017095 | 2/2004 |

OTHER PUBLICATIONS

Butson, MJ et al.: :Radiochromic film for medical radiation dosimetry Materials Science and Engineering R: Reports, Elsevier Sequoia S.A., Lausanne, CH, vol. 41, No. 3-5 Sep. 25, 2003, pp. 61-120.

Far West Technology: "Using Radiochromic Dosimeters" Jul. 16, 2003, http://web.archive.org/web/20030716052418/www.fwt.com/racm/support/PAL1.PDF> retrieved on Sep. 5, 2005 the whole document.

* cited by examiner

*Primary Examiner*—David P Porta
*Assistant Examiner*—Mark R Gaworecki
(74) *Attorney, Agent, or Firm*—Norris McLaughlin & Marcus

(57) ABSTRACT

A dosing film for measuring ultraviolet rays and/or electron beams, formed of a radiation-sensitive layer having covering films on both sides.

18 Claims, 1 Drawing Sheet

DOSING FILM AND ASSOCIATED METHOD

Figure 1:
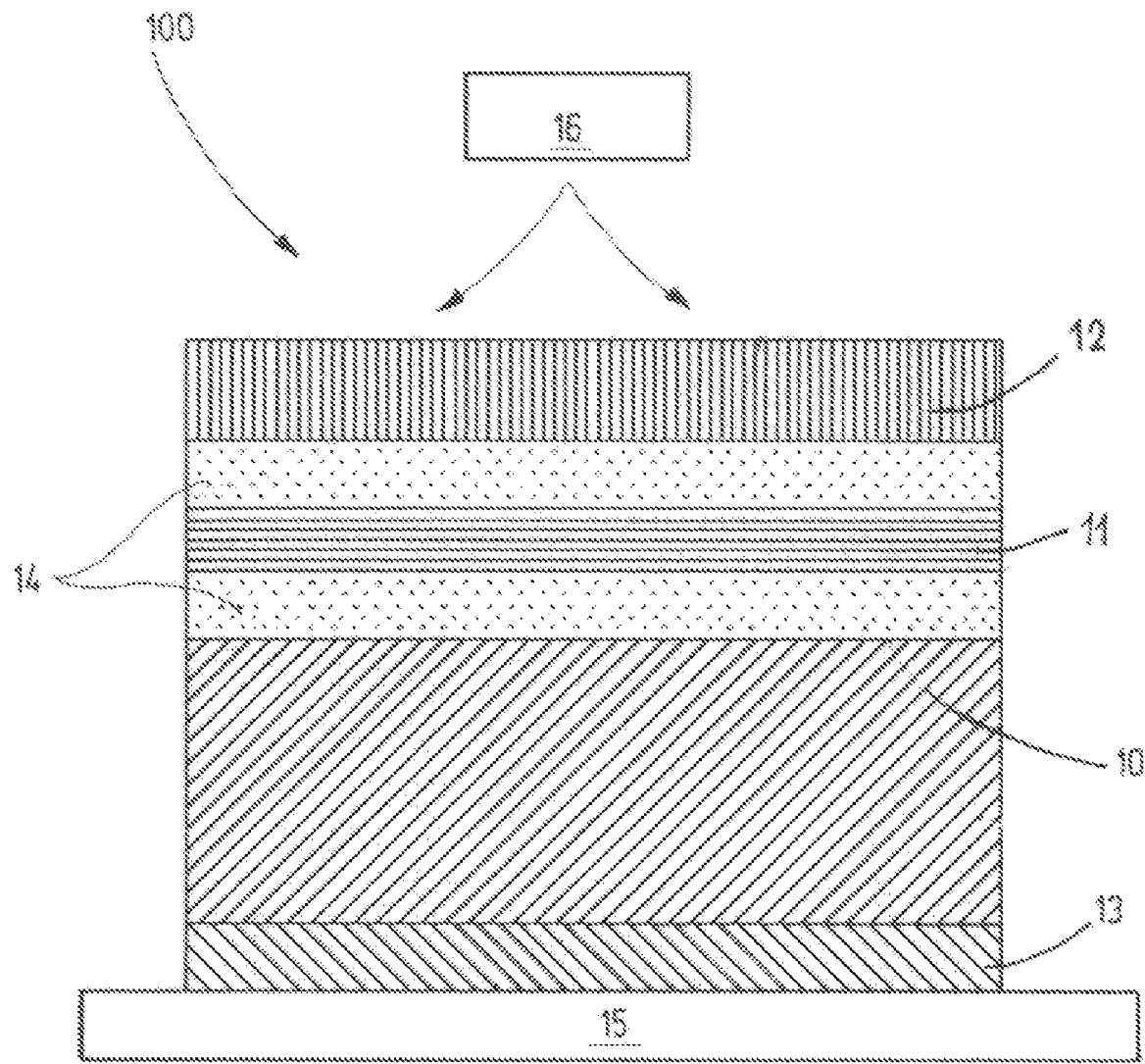

This is a 371 of PCT/EP2005/051734 filed 20 Apr. 2005 (international filing date).

The invention relates to a dose-measurement film for the measurement of UV radiation and/or electron-beam radiation with a radiation-sensitive layer, and also to a dose-measurement method and a use of the dose-measurement film.

BACKGROUND OF THE INVENTION

The company tesa AG, Hamburg produces a dose-measurement film for electron-beam radiation. In this film, a radiation-sensitive layer of thickness 20 μm has been arranged on a polyester film of thickness 50 μm. The radiation-sensitive layer is in essence composed of a polyester lacquer and of the radiation-sensitive dye pararosaniline nitrile. To produce the measurement film, the constituents of the layer are mixed in a solvent and applied to the polyester film. The solvent is then in turn removed from the layer in a drier.

The radiation-induced color reaction of pararosaniline nitrile in the dosimeter foil is given below:

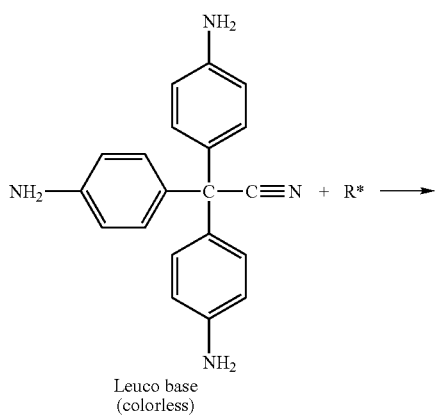

Leuco base
(colorless)

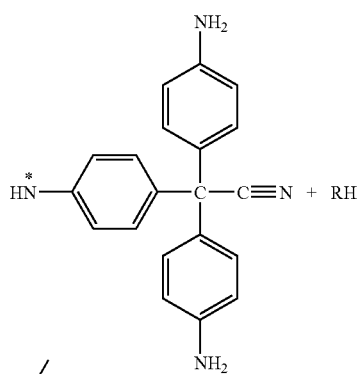

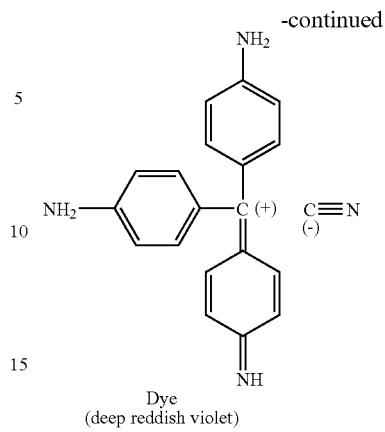

Dye
(deep reddish violet)

The radiation-sensitive dye pararosaniline present in the measurement film is transparent prior to irradiation. As radiation dose increases it assumes an increasingly strong red color, since green light with wavelength maximum of about 550 nm is absorbed by the dye.

The following relationship applies to transmittance of green light through the film:

$$T_{gr} = T_{gr0} * e^{-(a*d + b*D*d)}$$

where $T_{gr0}$=constant, about 0.88, since a portion of the incident light is reflected by the surface.

$T_{gr}$=transmittance of green light a=radiation-independent absorption coefficient d=thickness of radiation-sensitive layer b=absorption coefficient which defines the radiation-sensitivity of the film D=electron-beam radiation dose For a measured transmittance, the electron-beam radiation dose received is therefore:

$$D = -\frac{\ln(T_{gr}/T_{gr0})}{b*d} - \frac{a}{b}$$

From the formula it can be seen that thickness variations of the radiation-sensitive layer lead to measurement deviations of the same percentage magnitude. However, considerable cost is required to produce layer thicknesses of 20 μm with very small thickness deviations.

tesa AG therefore produces a second dose-measurement film for electron-beam radiation in which iron oxide is mixed into the radiation-sensitive layer. Prior to irradiation, the layer with iron oxide admixture has the same absorption coefficients a. for red and green light. Furthermore, the transmittance $T_{rt}$ for red light at about 650 nm is independent of the electron-beam radiation dose.

The transmittance $T_{rt}$ for red light is therefore used for thickness correction according to the relationship known to the person skilled in the art:

$$T_{rt} = T_{rt0} * e^{-a*d}$$

The result for the electron-beam radiation dose D when the transmittance for green and red light is incorporated with the given precondition $T_{rt0} = T_{gr0}$ is:

$$D = \left(\frac{\ln(T_{rt})}{\ln(T_{gr})} - 1\right) * b$$

The company Polymer-Physik, Tübingen has produced a measurement device appropriate to the film, in which red and green light is generated via respectively a green light-emitting diode and a red light-emitting diode arranged alongside one another. The transmittances of the measurement film are measured via two photo transistors opposite to the light-emitting diodes. The device indicates the electron-beam radiation dose directly to the user in the conventional unit "kilogray" (kGy).

The dose-measurement film is mainly used for electron-beam systems in which material to be irradiated in the form of a web is run past an electron-beam source, and is suitable for electron-beam radiation doses of about 3 to 50 kGy.

There have hitherto been no dose-measurement films which have sufficient absolute accuracy for the calibration of UV sources, for determination of UV radiation doses on industrial UV systems. Operators of UV systems therefore in essence use flat electronic devices which are adhesive-bonded to the web running through the UV system. By way of example, the "Power Puck" dose-measurement device from the company IET, USA has a diameter of about 100 mm and a thickness of about 15 mm, and these measurement devices cannot therefore be run through UV systems in which the UV sources have been arranged over deflector rolls for the conveying of material in the form of a web.

Since no alternatives with sufficient accuracy are available here, a complicated method involving product features has to be used to operate quality assurance. Furthermore, conventional electrically operated UV sources lose about 20% of their intensity in the first 1000 operating hours and are susceptible to soiling. Analysis of the causes of variations in product quality is therefore difficult without UV dose measurements.

Another factor is that, by way of example, when the "Power Puck" described is used in systems for the conveying of materials in the form of a web the dose is determined about 15 mm above the web and not on the web itself, and moreover obliquely incident radiation is only inadequately detected by virtue of the measurement sensor geometry, the result being that considerable deviations can occur with respect to the radiation dose within the product.

The situation in the case of three-dimensional moldings run through UV systems is even more problematic. Here, it is practically impossible to achieve correct location-dependent determination of the dose on the surface of the moldings using a "Power Puck".

The dose-measurement film from tesa AG described at an earlier stage above for electron-beam radiation assumes a red color when irradiated with UV light. However, its dependencies for UV radiation are not reproducible, and it cannot therefore be used for the UV-irradiation sector, which is of substantial commercial interest. In addition, the dye used, pararosaniline, is too sensitive for the UV dose range of interest. Furthermore, a thermally induced color change takes place above about 60° C. Radiation-induced heating in most UV polymerization systems and UV crosslinking systems exceeds that temperature.

The problem faced by the person skilled in the art in the light of this prior art is to provide a dose-measurement film which can detect not only electron-beam radiation but also UV radiation with sufficient measurement accuracy, in particular when the material to be irradiated is flexible. A further intention is to provide a corresponding dose-measurement method.

SUMMARY OF THE INVENTION

The fundamental concept of the invention is that reproducible behavior of the dose-measurement film for UV radiation is obtained if the dose-measurement film is given a blister-free protective covering on both sides, and the outer film here facing toward the UV source reduces the radiation dose, by virtue of a suitable material and a suitable thickness, to an extent such that the radiation-sensitive layer of the dose-measurement film receives a suitable UV dose and does not overheat. It is self-evident that there may also be a plurality of different radiation-sensitive layers arranged in the dose-measurement film which are in particular sensitive to different types of radiation and which jointly have been given a protective covering by outer foils on both sides. A decisive factor here is that the outer foils are in immediate full-surface contact with the radiation-sensitive layer, without any intervening air inclusions.

DETAILED DESCRIPTION

The advantage of the invention is that use of the outer foils as described below avoids inhibition of the radiation-sensitive layer via atmospheric oxygen or other influences. By way of example, the dose-measurement film can be exposed to a mechanical load by passage over deflector rolls, thus being subjected to buckling or bending. The additional protective-covering foil or, respectively, the outer foils applied on both sides protect(s) the UV-sensitive layer from abrasion, so that even after or during mechanical loading it is possible to make a visual monitoring check of the radiation exposure of the dose-measurement film. The additional protective-covering foil permits in particular the handling of very thin radiation-sensitive layers which are used, for example, in dose-measurement films for electron-beam curing. Here, it is preferable to use radiation-sensitive layers which are sensitive not only to UV radiation but also to electron-beam radiation.

The additional outer foil achieves impermissible heating via temperature-related effects during the radiation of the radiation-sensitive layer and, respectively, excessive radiation exposure, via a reduction in the amount of radiation reaching the radiation-sensitive layer. This can be carried out by a person skilled in the art by selecting the appropriate thickness and material of the outer foils.

An embodiment stated in claim 2 permits use of a dose-measurement film to measure the amount not only of UV radiation but also of electron-beam radiation. A dye suitable for this purpose in the radiation-sensitive layer is pararosaniline, which is known to the person skilled in the art and which can be incorporated within a suitable carrier material.

In addition, there can be an opacifier, in particular iron oxide, provided in the radiation-sensitive layer as characterized in claim 3. With this it is possible, as described above, to eliminate measurement errors through thickness variations.

It is preferable that the thickness of the radiation-sensitive layer has been designed as claimed in claim 4 to be from 1 to 15.0 μm and in particular from 2 to 50 μm, in order to obtain a flexible dose-measurement film which can also be adhesive-bonded to flexible materials which are conducted over deflector rolls in an irradiation system, for example.

Claim 5 proposes that, for absorption of the UV radiation in the outer foil, its thickness has been designed so that from 0.1 to 95%, and in particular from 1 to 50%, of the UV radiation impacting the dose-measurement film, and in particular here of the UVC radiation, preferably reaches the radiation-sensitive layer. The selection is made in accordance with the desired film sensitivity.

Materials proposed for the outer foils comprise as claimed in claim 6 plastics and/or coated paper, the plastic here preferably being selected from the following materials: PET, PP, PE, PVC and PS.

According to another embodiment in claim 7, one or both of the outer foils is/are composed of a vapor-deposited metallic reflective layer which reflects a portion of the radiation as a function of its vapor-deposited thickness. This metallized reflective layer can itself have been designed to be radiation-sensitive.

A proposal for application of the radiation-sensitive layer to the first outer foil is as claimed in claim 8 that the radiation-sensitive layer or its constituents is/are dissolved in solvents suitable for this purpose and deposited on the outer foil. Deposition takes place in particular at a thickness such that the radiation-sensitive layer itself has sufficient intrinsic stability capable in turn of being peeled from the outer foil. The adhesion between the outer foil and the radiation-sensitive layer here can be adjusted by the person skilled in the art within the desired magnitude via pretreatment of the outer foil. By way of example, the outer foil is pretreated in a corona system.

For attachment of the dose-measurement film on a desired substrate according to claim 9 at least one of the outer foils has been provided with an adhesive layer on its outward-facing side, for adhesive-bonding of the dose-measurement film on the substrate. For handling of the dose-measurement film, which has usually been wound up to give a roll, this adhesive layer itself has been provided with a further release layer preferably in the form of a release liner, or the other opposite outer foil has been release-treated on its outward-facing side.

For bonding of the outer foils to the radiation-sensitive layer, claim 10 describes that adhesive layers are used to bond these respectively to one another. Adhesives that can be used are in particular solvent-containing adhesives or hot-melt adhesives.

Crosslinking by UV radiation has become a widely used process technology, for example in the crosslinking and polymerization of lacquers, printing inks and adhesive masses which can be coated on backing materials such as foils, fabrics, tiles, wood or metal. UV radiation is also used for the sterilization of various articles and in the electronics industry for production of chips and of circuit boards.

For measurements on irradiated UV-dose-measurement films, a measurement device has been developed and is based on the measurement principle described at an earlier stage above of the device from the company Polymer-Physik. However, instead of a light-emitting diode for red and one for green it comprises only one light-emitting diode, which can be switched electronically between the two colors. The measurement for both wavelengths is therefore carried out at exactly the same location, with a resultant marked increase in measurement accuracy. Furthermore, only one phototransistor is needed, thus eliminating any drifting.

A feature of the inventive method is that the dose-measurement film is in each case irradiated with light of different wavelengths from one and the same light source, thus excluding, as stated above, measurement errors or drifting of the measurement results.

Typical irradiation apparatuses in which the dose-measurement method is used have radiation apparatuses with source powers of from 40 to 240 W/cm per source, and the UV systems here can be composed of from 1 to 10 or more tube-shaped sources. The dose-measurement method is also suitable for sources of lower power and with other structural shapes. The radiation doses that can be measured using the UV-dose-measurement film developed, for which the behavior of the film is linear, are from 0.5 to 50 mJ/cm$^2$ when no particular measures are taken to keep the film cool. It is self-evident that the dose-measurement films can additionally be cooled in order to increase their capability. When the film does not run immediately past a high-power UV source or is not excessively heated it remains linear up to about 200 mJ/cm$^2$. The abovementioned radiation doses correlate here with the values measured for UV-C radiation using the "Power Puck". Since sensors with various wavelengths and wavelength ranges are used in the electronic UV dosimeters available on the market, different products can be irradiated with the respective UV radiation doses needed.

It is preferable that as stated in claim 12 the light of the different wavelengths is generated by a photodiode which is known to the person skilled in the art and is easy to handle and is long-lived.

Furthermore, as claimed in claim 13 it is possible to draw film strips or dose-measurement films of any desired length by motor through the measurement device, thus permitting any desired endless materials to be equipped with the dose-measurement films and irradiated in a desired manner.

As claimed in claim 14, using process technology known to the person skilled in the art, the measured values from the measurement device are read out from a computer or are immediately transferred thereto and preferably displayed in the unit "mJ/cm$^2$" for purposes of easy monitoring.

In particular, as claimed in claim 16, the dose-measurement method or the dose-measurement film is used to measure the amount of high-energy UV-C radiation or even higher-energy electromagnetic radiation, since a desired proportion of the radiation is absorbed in the additional outer foil.

The dose-measurement method using the dose-measurement film is preferably suitable for conduct in a measurement device described above using a light source which can be switched over between two different colors.

It is also possible to display, in a diagram reproduced on a computer screen, a location-dependent representation of the entire UV radiation acting on the dose-measurement film in order, for example, to permit monitoring of the entire web width of a material to be irradiated.

Particular possibilities here are irradiation across the entire width of a material in the form of a web, and also control via the inventive dose-measurement film. Furthermore, three-dimensional parts onto which the dose-measurement film has been adhesive-bonded can also be irradiated in a desired manner, while the dose-measurement film permits measurement of the amount of the entire radiation dose on the surface of the three-dimensional item.

A sensitivity factor is determined for each batch produced of the dosimeter film and is noted on the film rolls. This sensitivity factor can be input into the measurement device and saved as a parameter. Ability to calibrate the measurement devices for the future is thus provided.

An embodiment of the invention is described in more detail below on the basis of the drawing.

FIG. 1 shows: a cross section of a dose-measurement film.

The structure of a dose-measurement film 100 can be seen from the illustration in FIG. 1. It is composed in essence of an outer foil which serves as support foil 10, of an elastic plastics material suitable for this purpose whose thickness can be selected by the person skilled in the art. On the support film 10, a UV-sensitive and/or electron-beam-sensitive layer 11 has been applied, for example deposited from a solution, which undergoes a color change by way of example when exposed to ultraviolet radiation. The design of the UV-sensitive layer 11 can be selected in any desired manner by the person skilled in the art. For protection of the UV-sensitive layer 11 from mechanical effects and in particular from excessive radiation effects, an outer foil 12 has been applied on the UV-sensitive layer 11 and has been suitably secured, e.g. adhesive-bonded. An adhesive layer 14 can be composed of an adhesive selectable by the person skilled in the art. The UV-sensitive layer 11 can also have been adhesive-bonded to the support film 10. As a function of the use of the dose-measurement film 100, the outer foil 12 has freely determinable thermally insulating and/or UV-absorbent and/or air-barrier properties. It is preferable that the outer foil 12, and also the support film 10, be composed of an elastic plastics material or of coated paper. The outer foil 12 also increases the mechanical stability of the dose-measurement film 100 and it is possible to provide a very thin UV-sensitive layer 11 in order to increase the sensitivity of the dose-measurement film 100. The dose-measurement film 100 adhesive-bonded to any desired substrate 15 can therefore also be conveyed over deflector rolls within a UV system. In order to attach the dose-measurement film 100 firmly at a desired location, a self-adhesive layer 13 can have been provided on the underside of the support film 10. In the UV system, the, for example, endless substrate 15 conveyed through the system, and also the dose-measurement film 100 adhesive-bonded thereto, is irradiated by UV lamps 16, whereupon by virtue of the protective-covering foil 12 only the desired extent of UV radiation acts on the radiation-sensitive layer 11 and, respectively, the substrate 15 situated thereunder. Checking of the dose-measurement film 100 permits monitoring of the actual amount of radiation and, respectively, calibration of an irradiation system.

FIG. 1 is not to scale, and this means that the thickness of the material of the support film 10, of the UV-sensitive layer 11 and of the outer foil 12 can in each case also be other than that illustrated here.

| KEY | |
|---|---|
| 10 | Support film, outer foil |
| 11 | UV-sensitive layer |
| 12 | Outer foil |
| 13 | Self-adhesive layer |
| 14 | Adhesive layer |
| 15 | Substrate |
| 16 | UV source |
| 100 | Dose-measurement film |

We claim:

1. A dose-measurement film (100) for the measurement of UV radiation, electron-beam radiation, or both, with a radiation-sensitive layer (11), wherein covering films (10, 12) are provided on both sides of the radiation-sensitive layer (11), and wherein the radiation-sensitive layer (11) comprises the dye pararosaniline nitrile.

2. The dose-measurement film as claimed in claim 1, wherein the radiation-sensitive layer (11) comprises an iron oxide opacifier.

3. The dose-measurement film as claimed in claim 1 wherein the thickness of the radiation-sensitive layer (11) is from 1 to 150 .mu.m.

4. The dose-measurement film as claimed in claim 3, wherein said thickness is from 2 to 250 µm.

5. The dose-measurement film as claimed in claim 1, wherein the thickness of the covering films (10, 12) is a thickness which allows from 0.1% to 95% of the UV radiation impacting the dose-measurement film to reach the radiation-sensitive layer (11).

6. The dose-measurement film as claimed in claim 5, wherein said thickness is a thickness which allows from 1% to 50%, of the UV radiation impacting the dose-measurement film to reach the radiation-sensitive layer (11).

7. The dose-measurement film as claimed in claim 1, wherein the covering films (10, 12) are composed of plastic, coated paper or both.

8. The dose-measurement film as claimed in claim 1, wherein one or both of the covering films (10, 12) are composed of a vapor-deposited metallic reflective layer or have been provided with a vapor-deposited metallic layer.

9. The dose-measurement film as claimed in claim 1, wherein the radiation-sensitive layer (11) is a layer formed by deposition from a solvent onto one of said covering films (10, 12).

10. The dose-measurement film as claimed in claim 1, wherein at least one of the covering films (10, 12) has an adhesive layer on its outward-facing side.

11. The dose-measurement film as claimed in claim 1, wherein the radiation-sensitive layer (11) is adhesively bonded to the covering film (12), the covering film (10), or both.

12. A dose-measurement method comprising,
generating, in a measurement device, light with two or more different wavelengths using a light source switchable between the different wavelengths; and,
determining the optical transmittance of a dose-measurement film (100) at the different wavelengths, wherein the dose-measurement film has a radiation-sensitive (11), wherein covering films (10, 12) are provided on both sides of the radiation-sensitive layer (11), and wherein the radiation-sensitive layer (11) comprises the dye pararosaniline nitrile.

13. The dose-measurement method as claimed in claim 12, wherein a light-emitting diode is used to generate the light.

14. The dose-measurement method as claimed in claim 13, wherein the dose-measurement film (100) is drawn by a motor through the measurement device.

15. The dose-measurement method as claimed in claim 12, wherein the dose-measurement film (100) is drawn by a motor through the measurement device.

16. The dose-measurement method as claimed in claim 12, wherein measured values from the measurement device are transferred by way of an electronic connection to a computer and a direct display of the radiation dose in "$mJ/cm^2$" is provided.

17. The dose-measurement method as claimed in claim 12, wherein a representation of the radiation dose as a function of the location on the dose-measurement film (100) is read out from the measurement device.

18. The dose-measurement method as claimed in claim 12, wherein the dose-measurement film (100) is irradiated with UVC radiation or with electromagnetic radiation of even shorter wavelength.

* * * * *